(12) United States Patent
Yan et al.

(10) Patent No.: US 8,488,554 B2
(45) Date of Patent: Jul. 16, 2013

(54) METHOD AND SYSTEM FOR HANDOVER BETWEEN DIFFERENT TYPES OF ACCESS SYSTEMS

(75) Inventors: Wenjun Yan, Shenzhen (CN); Lina Liu, Shenzhen (CN); Weihua Hu, Shenzhen (CN); Shanshan Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 599 days.

(21) Appl. No.: 12/429,416

(22) Filed: Apr. 24, 2009

(65) Prior Publication Data

US 2009/0201883 A1    Aug. 13, 2009

Related U.S. Application Data

(63) Continuation of application No. PCT/CN2007/070959, filed on Oct. 25, 2007.

(30) Foreign Application Priority Data

Oct. 25, 2006    (CN) .......................... 2006 1 0149802

(51) Int. Cl.
*H04W 4/00* (2009.01)
(52) U.S. Cl.
USPC ........................................ 370/331; 455/436
(58) Field of Classification Search
USPC ............... 370/328, 329, 331; 455/432, 432.1, 455/436, 439, 440, 517, 524, 422.1; 726/15
See application file for complete search history.

(56) References Cited

U.S. PATENT DOCUMENTS

| | | | |
|---|---|---|---|
| 7,289,504 B1 | 10/2007 | Hippelaeinen et al. | |
| 2001/0048686 A1 | 12/2001 | Takeda et al. | |
| 2002/0028690 A1* | 3/2002 | McKenna et al. | ............. 455/517 |
| 2003/0185196 A1 | 10/2003 | Venkitaraman | |
| 2004/0192283 A1* | 9/2004 | Shaheen | ..................... 455/422.1 |
| 2004/0246933 A1 | 12/2004 | Valko et al. | |
| 2004/0264476 A1 | 12/2004 | Alarcon et al. | |
| 2005/0025132 A1 | 2/2005 | Harper et al. | |

(Continued)

FOREIGN PATENT DOCUMENTS

| | | |
|---|---|---|
| CN | 1593071 A | 3/2005 |
| CN | 1823545 A | 8/2006 |

(Continued)

OTHER PUBLICATIONS

European Supplementary Search Report dated (mailed) Jul. 19, 2010, issued in related European Application No. 07817150.1-1244/ 2071767, Huawei Technologies Co., Ltd.

(Continued)

*Primary Examiner* — Andrew Lai
*Assistant Examiner* — Zhiren Qin
(74) *Attorney, Agent, or Firm* — Leydig, Voit & Mayer, Ltd.

(57) ABSTRACT

A method for handover between different types of access systems in some embodiments consistent with the present invention includes: when the UE hands over between different types of access systems, the UE accesses the IASA connected with the UE in the source access system through the destination access system. Furthermore, the present invention discloses a handover system, and a UE that includes an IASA address storing module and an IASA address sending module. The handover system includes: a destination access system, and a source IASA.

4 Claims, 6 Drawing Sheets

U.S. PATENT DOCUMENTS

| | | | |
|---|---|---|---|
| 2006/0104262 A1 | 5/2006 | Kant et al. | |
| 2006/0130136 A1* | 6/2006 | Devarapalli et al. | 726/15 |
| 2007/0021120 A1* | 1/2007 | Flore et al. | 455/436 |
| 2007/0218903 A1* | 9/2007 | Grech | 455/436 |
| 2007/0224988 A1 | 9/2007 | Shaheen | |
| 2008/0259869 A1* | 10/2008 | Wang et al. | 370/331 |
| 2009/0201883 A1 | 8/2009 | Yan et al. | |

FOREIGN PATENT DOCUMENTS

| | | |
|---|---|---|
| CN | 102123373 B | 4/2013 |
| WO | WO 01/28185 A1 | 4/2001 |
| WO | WO 2005/002266 A1 | 1/2005 |
| WO | WO 2005002266 A1 * | 1/2005 |
| WO | 2008/052467 A1 | 5/2008 |

OTHER PUBLICATIONS

Written Opinion of the International Searching Authority (translation) dated (mailed) Feb. 14, 2008, issued in related Application No. PCT/CN2007/070959, filed Oct. 25, 2007, Huawei Technologies Co., Ltd.

3GPP; "Inter access system handover between 3GPP and non 3GPP access systems", 3GPP TSG SA WG2 Architecture—S2 #52, S2-061497, May 2006, 2 pgs.

C. Perkins, Ed., Network Working Group, "IP Mobility Support for IPv4", rfc3344.txt, Aug. 2002, 89 pgs.

D. Johnson, Network Working Group, "Mobility Support in IPv6", rfc3775.txt, Jun. 2004, 147 pgs.

P. Eronen, Ed., Network Working Group, IKEv2 Mobility and Multihoming Protocol (MOBIKE), Jun. 2006, 30 pgs.

GSM; 3$^{rd}$ Generation Partnership Project; Technical Specification Group Services and System Aspects; General Packet Radio Service (GPRS); Service description; Stage 2 (Release 6) 3GPP TS 23.060 V6.13.0, Jun. 2006, 213 pgs.

GSM; 3$^{rd}$ Generation Partnership Project; Technical Specification Group Services and System Aspects; 3GPP System Architecture Evolution: Report on Technical Options and Conclusions (Release 7) 3GPP TR 23.882 V1.3.0, Jun. 2006, 138 pgs.

Second Chinese Office Action dated (mailed) Mar. 29, 2010, issued in related Chinese Application No. 200610149802.4 Huawei Technologies Co., Ltd.

European Patent Office Communication pursuant to Article 94(3) EPC, European search opinion for Application No. 07817150.1, mailed Mar. 28, 2011, Huawei Technologies Co., Ltd.

3GPP TSG SA WG2 Architecture, "Inter access system handover between 3GPP and non 3GPP access systems," Feb. 2006.

3GPP TSG SA WG2 Architecture, "Proposed architecture for inter acess system handover between 3GPP and non 3GPP access systems," Jan. 2006.

European Patent Office Communication pursuant to Article 94(3) EPC, European search opinion for Application No. 07 817 150.1-1244, mailed Nov. 24, 2011, Huawei Technologies C., Ltd 10 pgs.

3GPP TR 23.882 draft v1.1.0 (Apr. 2006); *Technical Report*; 3rd Generation Partnership Project; Technical Specification Group Services and System Aspects; 3GPP System Architecture Evolution: Report on Technical Options and Conclusions (Release 7) (120 pgs.).

European Patent Office Communication pursuant to Rule 62 EPC, the European search report (R. 61 EPC) or the partial European search report/declaration of no search (R. 63 EPC) and the European search opinion related to Application No. 11006795.6-1244 / 2389043, mailed Nov. 24, 2011, Huawei Technologies Co., Ltd. (11 pgs.).

First Office Action in related U.S. Appl. No. 13/331,154, dated Feb. 10, 2012 (17 pgs.).

Final Office Action mailed Jul. 12, 2012, issued in related U.S. Appl. No. 13/331,154, Huawei Technologies Co., Ltd., (37 pages).

Chinese Second Office Action mailed Jul. 3, 2012, issued in related Chinese Application No. 201110067363.3, Huawei Technologies Co,, Ltd. (8 pages).

1$^{st}$ Office Action in corresponding Chinese Patent Application No. 200610149802.4 (Jun. 5, 2009).

1$^{st}$ Office Action in corresponding Chinese Patent Application No. 201110067363.3 (Nov. 30, 2011).

"S2-061497—Inter Access System Handover Between 3GPP and Non 3GPP Access Systems," 3GPP TSG SA WG2 Architecture—S2 #52, May 8-12, 2006, 3GPP, Valbonne, France.

3$^{rd}$ Office Action in corresponding U.S. Appl. No. 13/331,154 (Jan. 4, 2013).

International Search Report in corresponding International Patent Application No. PCT/CN2007/070959 (Feb. 14, 2008).

2$^{nd}$ Office Action in corresponding U.S. Appl. No. 13/331,154 (Jul. 12, 2012).

* cited by examiner

METHOD AND SYSTEM FOR HANDOVER BETWEEN DIFFERENT TYPES OF ACCESS SYSTEMS

CROSS-REFERENCE TO RELATED APPLICATION

This application is a continuation of International Application No. PCT/CN2007/070959, filed on Oct. 25, 2007, titled "Method and system for handover between different types of access systems", which claims the priority of Chinese Patent Application No. 200610149802.4, filed on Oct. 25, 2006, titled "Method and system for handover between different types of access systems", the entire contents of all of which are incorporated herein by reference.

TECHNICAL FIELD

The present invention relates to the field of mobile communication technologies, and in particular, to a method and system for handover between different types of access systems.

BACKGROUND

In order to enhance the competitiveness of mobile networks in the future, the 3rd Generation Partnership Project (3GPP) is focusing on the System Architecture Evolution (SAE) that integrates multiple networks for the next stage of development. In an SAE network architecture shown in FIG. 1, the user may access the Evolved Packet Core through a 3GPP access system or through a non-3GPP access system. The 3GPP access system is a General Packet Radio Service (GPRS), Universal Mobile Telephone System (UMTS), or SAE. The non-3GPP access system is a Wireless Local Area Network (WLAN), Worldwide Interoperability for Microwave Access (WiMAX) network, Code Division Multiple Access (CDMA) system, or CDMA2000.

As shown in FIG. 1, the Evolved Packet Core includes three logic function modules: Mobility Management Entity (MME)/User Plane Entity (UPE), 3GPP anchor, and SAE anchor. The MME is responsible for mobility management on the control plane, including: managing user contexts and mobile states, allocating Temporary Mobile Subscriber Identifiers (TMSIs), and performing security functions. The UPE initiates paging for downlink data in the idle state, and manages and stores the parameters over the Internet Protocol (IP) and the routing information in the network. The 3GPP anchor is an anchor between the 2G/3G and the Long Term Evolution (LTE) access system, and the SAE anchor serves as a user-plane anchor between different access systems.

When the 3GPP anchor combines with the SAE anchor into an Inter Access Systems Anchor (IASA) serving as an outbound service anchor of all access technologies in the SAE, the User Equipment (UE) may be connected to the IASA through an Evolved RAN (E-RAN) or MME/UPE. In this case, the UE communicates with the MME/UPE by the Mobility Management (MM)/Session Management (SM) protocol, and the MME/UPE communicates with the IASA by GPRS Tunnel Protocol (GTP). Alternatively, the UE may also be connected to the IASA through a non-3GPP GW, the UE communicates with the non-3GPP Gateway (GW) through a specific radio protocol, and the UE communicates with the IASA by Mobile Internet Protocol (MIP) or IKEv2 Mobility and Multihoming Protocol (MOBIKE).

When the UE moves between the 3GPP access systems, the GTP protocol is used between the Serving GPRS Support Nodes (SGSNs) or used between the SGSN and the MME/UPE to transfer the UE-related information (for example, MM context and Packet Data Protocol (PDP) context) from the previous system to the current system. When the UE moves between non-3GPP access systems, the UE interacts with the IASA through the MIP/MOBIKE protocol.

However, when the UE moves between different types of systems, for example, hands over from a 3GPP access system to a non-3GPP access system, or from a non-3GPP access system to a 3GPP access system, it is very difficult to transfer service information of the UE between the MME/UPE and the non-3GPP GW. Therefore, when selecting the IASA, the Domain Name System (DNS) needs to be resolved again, which increases the time of the UE handover. Moreover, the UE may be anchored onto different IASAs when handing over to the current access system. Therefore, for the UE with an underway service, namely, the UE with an active service, the service tends to be interrupted. For example, when the UE with an active service hands over from a non-3GPP access system to a 3GPP access system, the UE needs to perform a new PDP context activation process at the 3GPP access system. When the UE activates the PDP context at the 3GPP access system, the MME/UPE performs DNS resolution for the Access Point Name (APN) provided by the UE, and selects a result as the IASA of this service. This mechanism is unable to ensure that the selected IASA is the IASA used when the UE performs the service at the non-3GPP access system. If the two IASAs are different, the underway service of the UE may be interrupted.

SUMMARY

Consistent with the disclosed embodiments, there is a method and system for handover between different types of access systems.

Furthermore, the present disclosure provides a User Equipment that, provides an IASA address for the destination access system.

In order to accomplish the foregoing objectives, the method for handover between different types of access systems consistent with some embodiments of the present disclosure provides: when the UE hands over between different types of access systems, the UE accesses the IASA connected with the UE in the source access system through the destination access system.

The handover system provided in the present disclosure may include a UE, a destination access system, and an IASA of a source access system. The UE is adapted to send the source IASA address to the destination access system during the handover process. The destination access system is adapted to receive the source IASA address from the UE, and access the source IASA corresponding to the source IASA address.

Furthermore, some embodiments consistent with the disclosure provides a UE. The UE may include an IASA address storing module and an IASA address sending module. The IASA address storing module is adapted to store the IASA address. The IASA address sending module is adapted to obtain the IASA address from the IASA address storing module, and send the obtained IASA address to the destination access system.

Alternatively, the UE includes an IASA address obtaining module and an IASA address sending module, wherein the IASA address obtaining module is adapted to obtain the source IASA address connected with the UE in the source access system, and send the obtained source IASA address to the IASA address sending module, and the IASA address sending module is adapted to receive the source IASA address from the IASA address obtaining module, and send the received source IASA address to the destination access system.

Therefore, in some embodiments, when the UE hands over between different types of access systems, the UE needs to access the IASA connected with the UE in the source access system through the destination access system. Therefore, it is not necessary to search for the IASA, Home Agent (HA) or Virtual Private Network (VPN) GW through a DNS resolution process in the destination access system, thus reducing the UE handover time. Moreover, this ensures that the UE has a consistent service anchor in the source access system and the destination access system, and the UE may use the same IP address to interact with external networks, thus overcoming service interruption caused by handover of the UE between different types of access systems and ensuring service continuity.

DETAILED DESCRIPTION

Consistent with the embodiments disclosed herein, the UE accesses the IASA connected with the UE in the source access system, namely, the source IASA, through the destination access system, when the UE hands over between different types of access systems.

In order to make the technical solution, objectives and merits of the disclosed embodiments clearer, the embodiments hereinafter are described in detail by reference to accompanying drawings and preferred embodiments.

Embodiment 1

When the UE hands over from a non-3GPP access system (source access system) to a 3GPP access system (destination access system), the UE needs to initiate the service activation process of the APN in the destination 3GPP access system. In this case, the UE sends the IASA address obtained in the non-3GPP access system (source IASA address) to the 3GPP access system. After obtaining the IASA address, the SGSN or MME/UPE in the 3GPP access system no longer initiates a DNS query, and uses the IASA address provided by the UE.

Figure 1:
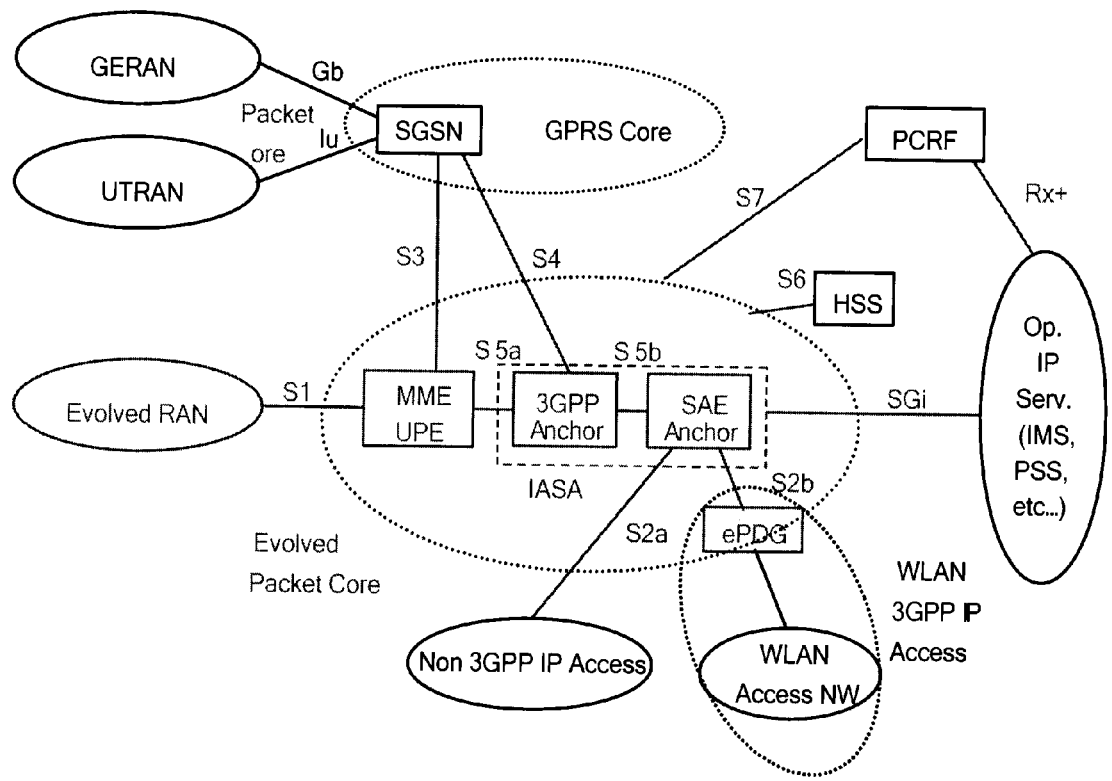
FIG. 1 shows an SAE network architecture in the prior art.
Figure 2:
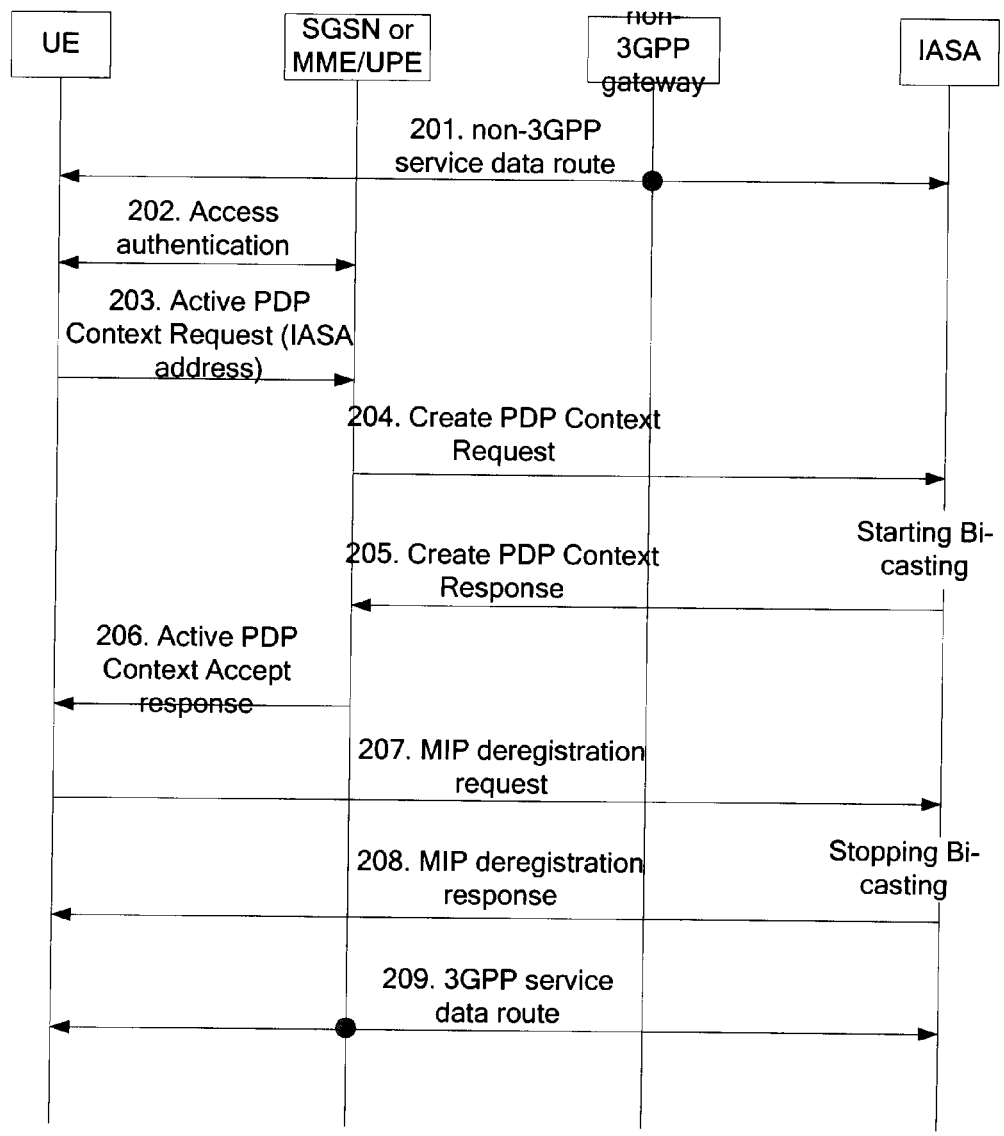
FIG. 2 shows an exemplary handover process of a UE in the first embodiment of the present disclosure.

As shown in FIG. 2, supposing that the non-3GPP access system adopts the MIP protocol, when the UE hands over from a non-3GPP access system to a 3GPP access system, the handover process in this embodiment may include the following steps:

Step 201: The service data route of the UE in the non-3GPP access system is: UE-non 3GPP GW-IASA.

Step 202: When detecting 3GPP radio signal, the UE performs access authentication process compliant with the 3GPP access system specifications.

Step 203: The UE sends an Active PDP Context Request to the SGSN or MME/UPE, performs the service activation process, and establishes an IP bearer in the 3GPP access system. Moreover, because the service on the APN is active, the request message of the UE carries the IASA address corresponding to the APN, namely, the IASA address used by the UE in the source access system.

It should be noted that the UE may also send the source IASA address to the SGSN or MME/UPE by other means.

The UE may also carry an IASA allocation identifier in the message for indicating whether to allow the SGSN or MME/UPE to reallocate the IASA address. For example, if the identifier is set to 1, the SGSN or MME/UPE is allowed to allocate the IASA address; if the identifier is set to 0, the SGSN or MME/UPE is not allowed to allocate the IASA address, and uses the IASA address provided by the UE instead.

In this embodiment, in order to keep the service anchor consistent between the source access system and the destination access system, the UE may use the same IP address to interact with the external network and ensure continuity of the service of the UE. The SGSN or MME/UPE is unable to change the IASA address provided by the UE, and the IASA allocation identifier needs to be set to 0.

Step 204: After receiving the Active PDP Context Request message from the UE, the SGSN or the MME/UPE sends a Create PDP Context Request to the IASA corresponding to the IASA address carried in the message, namely, the IASA used by the UE in the source access system (source IASA).

Step 205: After receiving the Create PDP Context Request message, the IASA starts the Bi-casting mechanism, sends service data to the UE through the 3GPP access system and the non-3GPP access system, and returns a Create PDP Context Response to the SGSN or MME/UPE.

In this case, the IASA does not need to reallocate an IP address to the UE, and may still use the IP address used by the UE in the source access system.

Step 206: After receiving the Create PDP Context Response message, the SGSN or MME/UPE sends an Active PDP Context Accept response message to the UE.

Step 207: After receiving the Active PDP Context Accept message, the UE sends a MIP deregistration request to the IASA through the non-3GPP access system.

Step 208: After receiving the MIP deregistration request, the IASA deletes the registration binding correlation information of the UE in the non-3GPP access system on the IASA, ceases the Bi-casting process, and returns a MIP deregistration response to the UE.

Step 209: The service data route of the UE in the 3GPP access system is: UE-3GPP MME/UPE-IASA.

Embodiment 2

Figure 3:
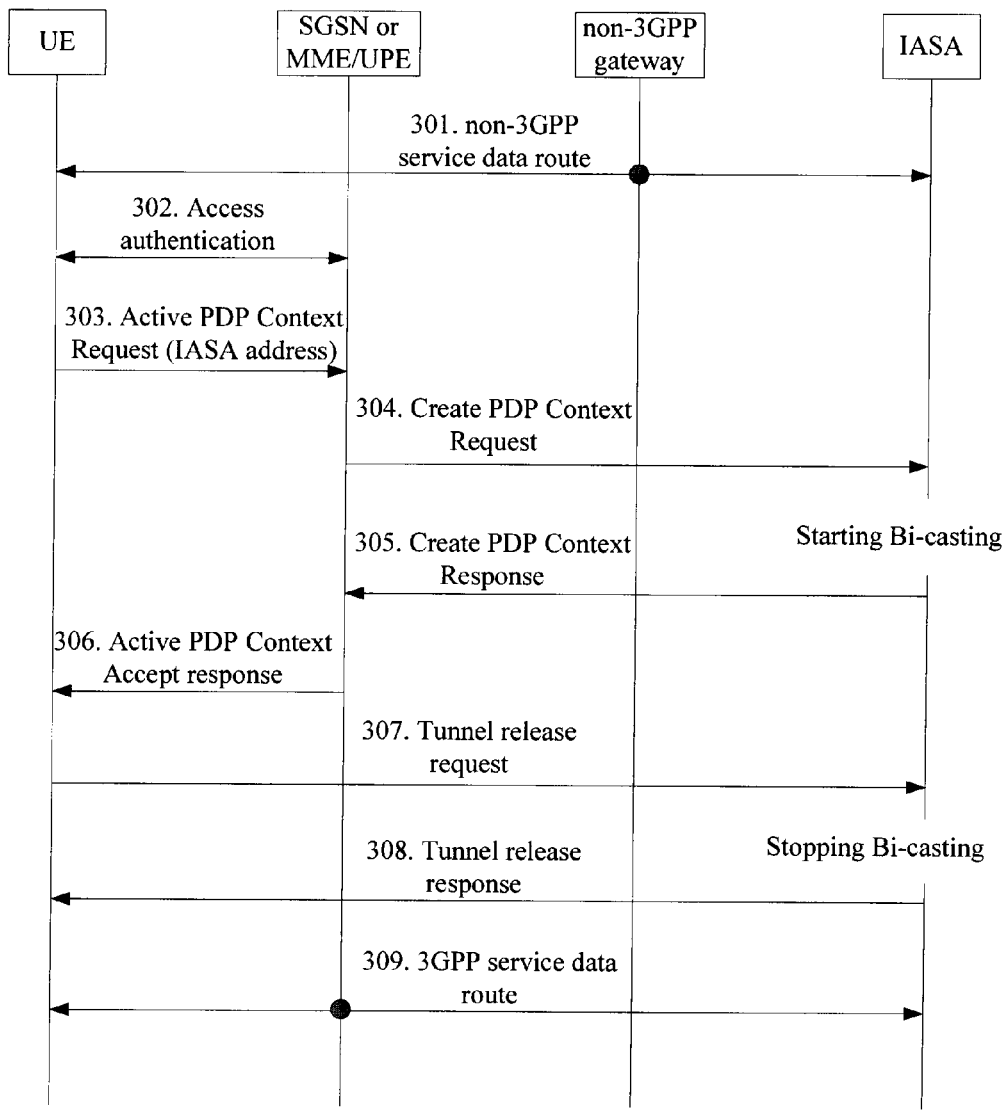
FIG. 3 shows an exemplary handover process of a UE in the second embodiment of the present disclosure.

As shown in FIG. 3, supposing that the non-3GPP access system adopts the MOBIKE protocol, when the UE hands over from a non-3GPP access system to a 3GPP access system, the handover process in this embodiment includes the following steps:

Steps 301-306: similar to steps 201-206 and not repeated here any further.

Step 307: After receiving the Active PDP Context Accept message, the UE sends a tunnel release request to the IASA through the non-3GPP access system.

Step 308: After receiving the tunnel release request, the IASA releases the tunnel, and returns a tunnel release response to the UE.

Step 309: The service data route of the UE in the 3GPP access system is: UE-3GPP MME/UPE-IASA.

Embodiment 3

When the UE hands over from a 3GPP access system (source access system) to a non-3GPP access system (destination access system), if the UE is connected to the SAE network through the non-3GPP access system based on the MIP protocol, the UE uses the IASA address obtained from the 3GPP access system as an HA address; if the UE is connected to the SAE network through the non-3GPP access system based on the MOBIKE protocol, the UE uses the IASA address obtained from the 3GPP access system as a VPN GW address, thus ensuring that the UE can access specified IASA in the SAE network through the destination non-3GPP access system.

Figure 4:
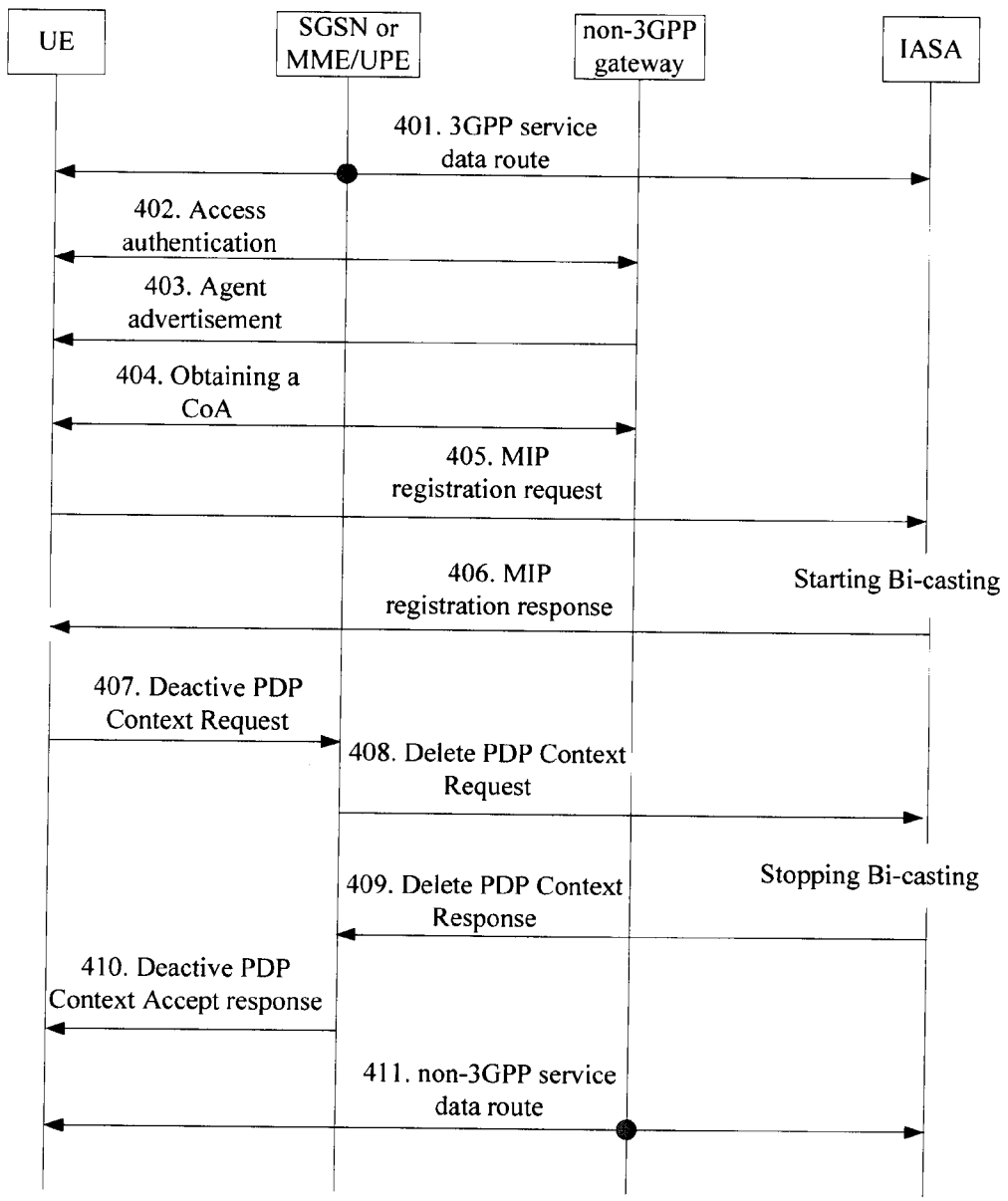
FIG. 4 shows an exemplary handover process of a UE in the third embodiment of the present disclosure.

As shown in FIG. 4, supposing that the non-3GPP access system adopts the MIP protocol, when the UE hands over from a 3GPP access system to a non-3GPP access system, the handover process in this embodiment may include the following steps:

Step 401: The service data route of the UE in the 3GPP access system is: UE-3GPP MME/UPE-IASA.

Step 402: When detecting non-3GPP radio signal, the UE performs access authentication process compliant with the non-3GPP access system specifications.

Step 403: The UE obtains the prefix information of the visited network through a router advertisement message.

Step 404: The UE obtains a Care-of Address (CoA).

If the address is a Mobile IP Version 4 Foreign Agent CoA (MIPv4 FA-CoA), step 404 is omitted.

Step 405: The UE uses the IASA address obtained from the 3GPP access system (namely, the IASA address used by the UE in the source access system) as an HA address, uses the IP address obtained from the 3GPP access system (namely, the UE IP) as a Home Address (HoA), and sends a MIP registration request to the IASA used in the source access system.

Step 406: After receiving the MIP registration request from the UE, the IASA establishes a binding correlation between the CoA and the HoA on the HA. As the PDP context is currently active on the HA, when a new binding correlation is established on the HA, the IASA starts the Bi-casting mechanism and returns a MIP registration response to the UE.

Step 406 and step 406 illustrate that the UE uses the IASA used by the UE in the source access system (namely, source IASA) as an HA to initiate MIP registration, without the need of obtaining the HA address through resolution, thus reducing the handover time.

Step 407: The UE initiates a PDP deactivation process, and sends a Deactive PDP Context Request to the SGSN or MME/UPE.

Step 408: After receiving the Deactive PDP Context Request message from the UE, the SGSN or MME/UPE sends a Delete PDP Context Request to the IASA.

Step 409: After receiving the Delete PDP Context Request message, the IASA deletes the PDP Context of the UE, releases the resources occupied by the UE in the 3GPP system, stops the Bi-casting process, and returns a Delete PDP Context Response to the SGSN or MME/UPE.

Step 410: After receiving the Delete PDP Context Response message, the SGSN or MME/UPE returns a Deactive PDP Context Accept response to the UE.

Step 411: The service data route of the UE in the non-3GPP access system is: UE-non 3GPP GW-IASA.

Embodiment 4

Figure 5:
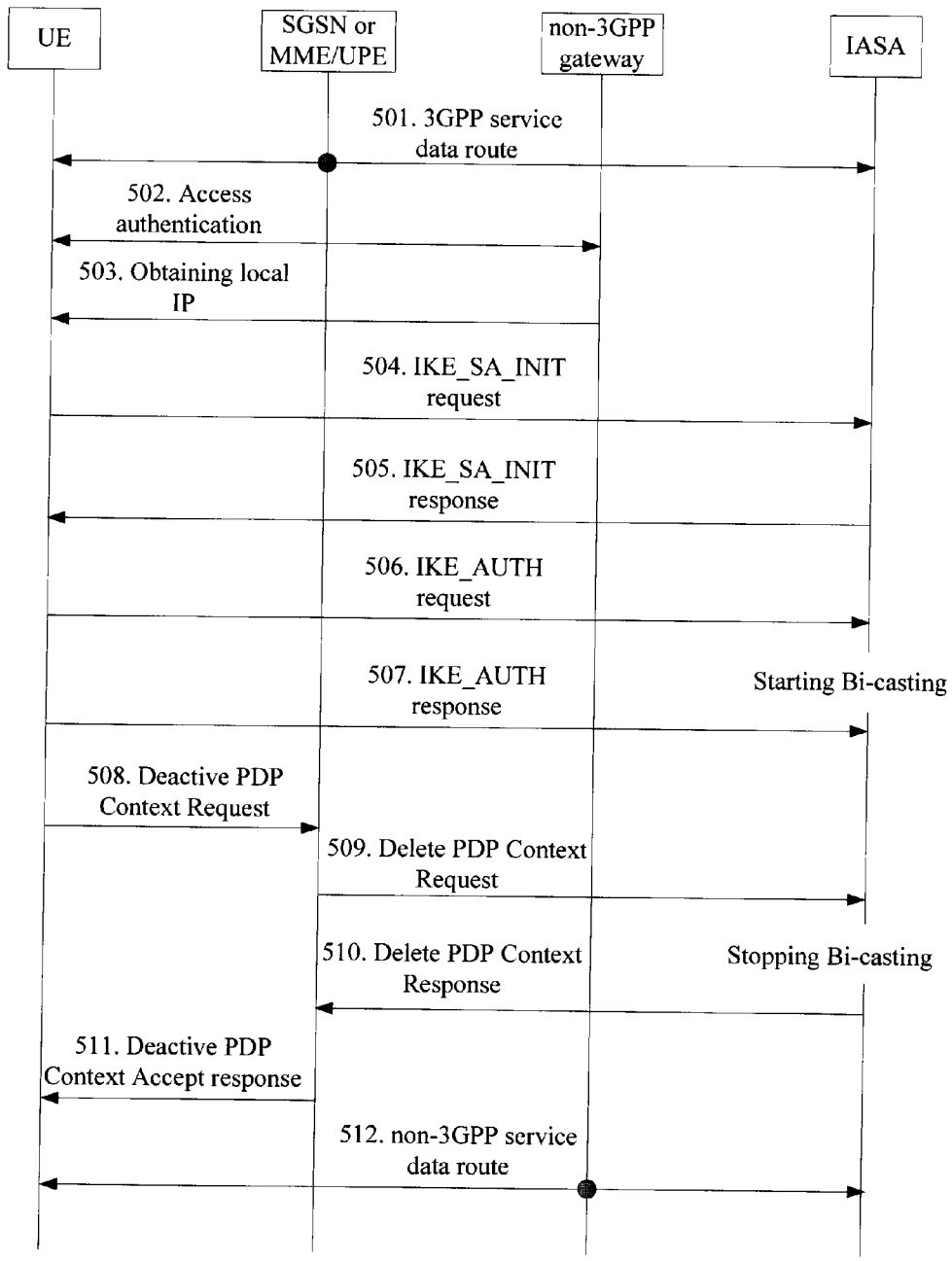
FIG. 5 shows an exemplary handover process of a UE in the fourth embodiment of the present disclosure.

As shown in FIG. 5, supposing that the non-3GPP access system adopts the MOBIKE protocol, when the UE hands over from a 3GPP access system to a non-3GPP access system, the handover process in this embodiment includes the following steps:

Step 501: The service data route of the UE in the 3GPP access system is: UE-3GPP MME/UPE-IASA.

Step 502: When detecting non-3GPP radio signal, the UE performs access authentication process compliant with the non-3GPP access system specifications.

Step 503: The UE obtains the IP address of the UE in the non-3GPP access system, namely, the local IP address.

Step 504: Because the UE stores the IASA address which corresponds to the APN and is obtained from the 3GPP access system, it is not necessary to perform DNS process, and the UE uses the IASA address used by the UE in the source access system as a VPN GW address to initiate Internet Key Exchange (IKE) process directly, and sends an IKE_SA_INIT request to the IASA used by the UE in the source access system (namely, source IASA) to exchange the IKE_SA_INIT message with the IASA.

Step 505: After receiving the IKE_SA_INIT request from the UE, the IASA returns an IKE_SA_INIT response to the UE.

Step 506: The UE sends an IKE_AUTH request to the IASA.

Step 507: The corresponding relation between the local IP of the UE and the remote IP (namely, the IP address obtained by the UE in the 3GPP access system) is stored in the IASA. After receiving the IKE_AUTH request message, the IASA starts the Bi-casting mechanism, sends downlink data to the UE through a 3GPP data path and a non-3GPP data path, and returns an IKE_AUTH response to the UE. Thus the IKEv2 negotiation process is finished.

Steps 504, 505, 506 and 507 illustrate that the UE may use the IASA used by the UE in the source access system (namely, source IASA) as a VPN GW to initiate creation of an Internet Protocol Security (IPsec) tunnel, without the need of obtaining the VPN GW address through resolution, thus reducing the handover time.

Steps 508-512: similar to steps 407-41 and are not repeated here any further.

It should be noted that: when the UE accesses the IASA through a non-3GPP access system, the UE saves the address of the accessed IASA. When the UE accesses the IASA through a 3GPP access system, the UE does not save the address of the accessed IASA. Therefore, in order to meet the requirements of the present invention, the UE that accesses the IASA through a 3GPP access system may obtain the IASA address. The UE obtains the IASA address through a 3GPP access system using several methods. For example, the US may obtain it through a service activation process, or obtain it through an Internet Control Message Protocol (ICMP) message router advertisement sent by the IASA on the IP layer, namely, the IASA sends its address to the UE through a router advertisement message.

An exemplary method of describing how the UE obtains the IASA address through a service activation process is detailed below by reference to FIG. 6. When the UE is attached to the 3GPP access system and initiates service activation process on an APN, the UE may obtain an IP address allocated by the IASA to the UE through the SGSN or MME/UPE, where the IP address is used for accessing external networks. Moreover, the UE may also needs obtain the IASA address. When the UE hands over from a 3GPP access system to a non-3GPP access system, the IASA address serves as the address of a service anchor of the SAE network used in the case of the UE accesses the IASA through a non-3GPP access network.

Figure 6:
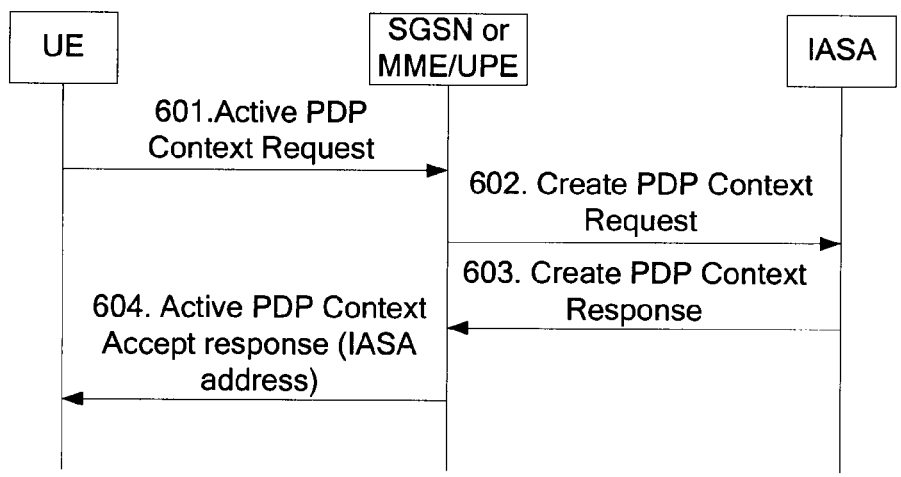
FIG. 6 shows an exemplary service activation process of a UE in the idle state consistent with some embodiments of the present disclosure.

As shown in FIG. 6, the service activation process of a UE in the idle state in a 3GPP access system may include the following steps:

Step 601: The UE sends an Active PDP Context Request message to the SGSN or MME/UPE, where the message carries an APN address, an IASA address, a UE IP, and an IASA allocation identifier, etc. The IASA address and the UE IP are empty or a static IP address. The IASA allocation identifier is adapted to indicate whether to allow the SGSN or MME/UPE to allocate an IASA address. As in the service activation process of an idle UE, the IASA allocation identifier may be set to a value which allows the SGSN or MME/UPE to allocate an IASA address.

It should be noted that the Active PDP Context Request message may carry neither the IASA address nor the IASA allocation identifier.

Step 602: After receiving the Active PDP Context Request message from the UE, the SGSN or MME/UPE performs DNS resolution for the APN carried in the message, selects a proper IASA, and sends a Create PDP Context Request message to the IASA.

Step 603: After receiving the Create PDP Context Request message from the SGSN or MME/UPE, the IASA creates a PDP context. If the UE does not have a static IP, the IASA may allocate a proper IP address to the UE, namely, UE IP, and returns a Create PDP Context Response message carrying the UE IP to the SGSN or MME/UPE.

Step 604: After receiving the Create PDP Context Response message from the IASA, the SGSN or MME/UPE sends an Active PDP Context Accept message to the UE, the message carrying the UE IP and the IASA address.

After receiving the Active PDP Context Accept message, the UE saves the UE IP and the IASA address carried in the message.

It should be noted that the handover mentioned herein not only covers the handover that occurs when the UE is in the active service state, namely, when the UE with an active service moves between different access systems, but also covers the handover that occurs when the UE is in the idle state, namely, when the UE in the idle state moves between different access systems.

Figure 7:
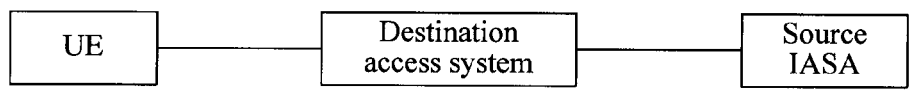
FIG. 7 shows an exemplary structure of a handover system consistent with some embodiments of the present disclosure.

Furthermore, as shown in FIG. 7, a handover system provided in some embodiments may include a UE, a destination access system, and a source IASA. The UE is adapted to send the source IASA address to the destination access system in the handover process. The destination access system is adapted to receive the source IASA address from the UE, and access the source IASA corresponding to the source IASA address.

The UE may include an IASA address storing module and an IASA address sending module. The IASA address storing module is adapted to store the IASA address; the IASA address sending module is adapted to obtain the IASA address from the IASA address storing module, and send the obtained IASA address to the destination access system.

Alternatively, the UE may include an IASA address obtaining module and an IASA address sending module, wherein the IASA address obtaining module is adapted to obtain the source IASA address connected with the UE in the source access system and send the obtained source IASA address to the IASA address sending module. The IASA address sending module is adapted to receive the source IASA address from the IASA address obtaining module, and send the received source IASA address to the destination access system.

Figure 8:
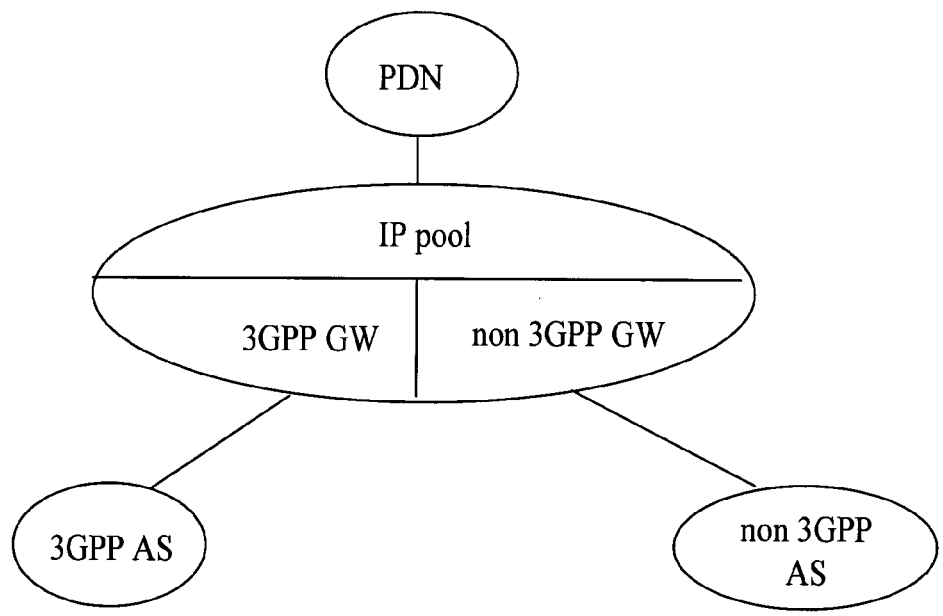
FIG. 8 shows an exemplary structure of an IASA consistent with some embodiments of the present disclosure.

As shown in FIG. 8, the IASA may be interconnected with different Access Systems (ASs) through different interface addresses. For example, the IASA may be connected with the SGSN or MME/UPE through the IP address of a subnet, and the IASA may be connected with the non-3GPP GW through the IP address of another subnet.

When the UE hands over between different types of access systems according to the method provided herein, the UE uses the source IASA address to perform a series of operations in the destination access system. For example, when the UE hands over from a 3GPP access system to a non-3GPP access system, the UE uses the IASA address used by the UE in the 3GPP access system as an HA address or VPN GW address to initiate MIP registration or IPsec tunnel creation. In this case, if the address of the IASA specific to the non-3GPP access system and the address specific to the 3GPP access system are in different subnets, the MIP registration or IPsec tunnel creation may fail.

In order to avoid such circumstances, the technical solution consistent with some embodiments may be modified. That is, when the UE accesses the IASA through an access system, the network side allocates two IASA addresses to the UE, namely, a 3GPP IASA address and a non-3GPP IASA address, which are both stored by the UE. The 3GPP IASA address refers to the IP address for connecting the IASA with the SGSN or MME/UPE. The non-3GPP IASA address refers to the IP address for connecting the IASA with the non-3GPP GW.

For example, when an idle UE with multiple radio access capabilities performs service activation in the 3GPP access system, the SGSN or MME/UPE sends a Create PDP Context Request to a 3GPP IASA address after APN resolution. As receiving the request, the IASA specifies a non-3GPP IASA address and returns it to the UE, and the UE stores the obtained 3GPP IASA address and non-3GPP IASA address. When the UE accesses the IASA through the non-3GPP access system, the UE initiates MIP registration or IPsec tunnel creation using a non-3GPP IASA address after a DNS performs APN resolution. The non-3GPP IASA specifies a 3GPP IASA address, and returns it to the UE. The UE stores both the obtained 3GPP IASA address and non-3GPP IASA address. So, when the UE hands over from a 3GPP access system to a non-3GPP access system, the UE uses the non-3GPP IASA address to initiate MIP registration or IPsec tunnel creation, and when the UE hands over from a non-3GPP access system to a 3GPP access system, the UE uses a 3GPP IASA address to initiate service activation at the 3GPP access system, thus avoiding the foregoing problem.

It should be noted that the IASA herein may be a Packet Data Network Gateway (PDN GW) or other entities with the IASA function.

Furthermore, the SGSN or MME/UPE herein may be collectively called a 3GPP access gateway.

Elaborated above are the objectives, technical solutions and benefits consistent with the disclosed embodiments. It should be understood that although the invention has been described through some exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the claims or their equivalents.

What is claimed is:

1. A method for handover between different types of access systems, the method comprising:
   when a User Equipment (UE) handovers from a non-3GPP access system to a 3GPP access system, accessing, by the UE, a source Inter Access Systems Anchor (IASA) connected with the UE in the non-3GPP access system through the 3GPP access system,
   wherein the step of accessing the source IASA comprises:
      during a service activation process in the 3GPP access system, sending, by the UE, an Active Packet Data Protocol (PDP) Context Request containing an address of the source IASA to a 3GPP access gateway, wherein, the Active PDP Context Request comprises an IASA allocation identifier for indicating whether to allow the 3GPP access gateway to reallocate the address of the source IASA; and
   determining, by the 3GPP access gateway, whether it is necessary to reallocate the address of the source IASA; and
   if it is unnecessary to reallocate the address of the source IASA, creating a PDP context between the 3GPP access gateway and the source IASA.

2. The method according to claim 1, wherein, the handover comprises: handover when the UE is in an idle state and handover when the UE is in an active service state.

3. The method according to claim 1, wherein the IASA is interconnected with the 3GPP access system and the non-3GPP access system through different interface addresses; and the method further comprises:
   allocating, by a network side, a 3GPP IASA address and a non-3GPP IASA address for the IASA; and
   storing, by the UE, the 3GPP IASA address and the non-3GPP IASA address.

4. The method according to claim 3, wherein accessing, by the UE, the IASA connected with the UE in the non-3GPP access system through the 3GPP access system further comprises: during the handover process, initiating, by the UE, service activation using the 3GPP IASA address stored on the UE in the 3GPP access system.

* * * * *